April 15, 1924.  1,490,720
E. F. W. ALEXANDERSON
SYSTEM OF MOTOR CONTROL
Filed Jan. 9, 1922
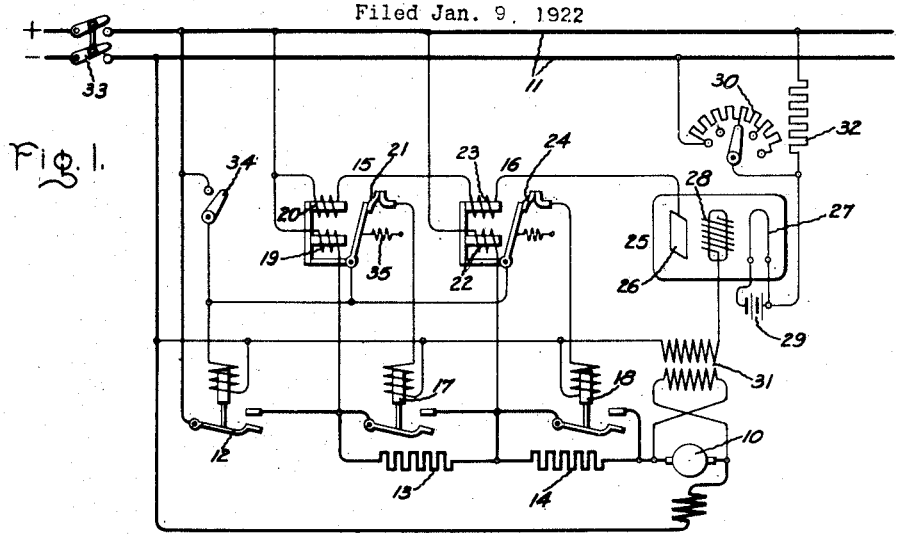
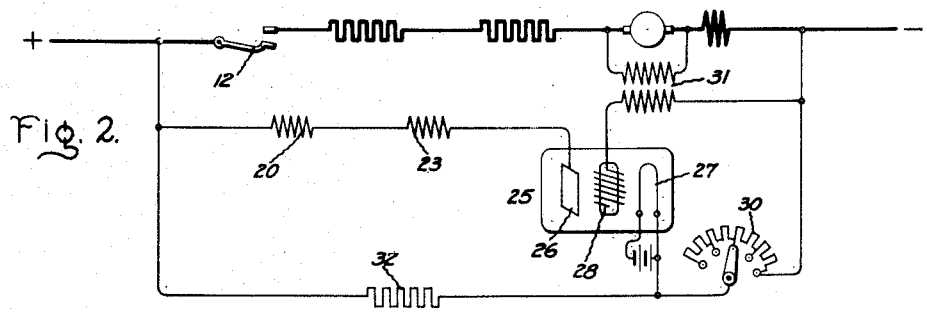
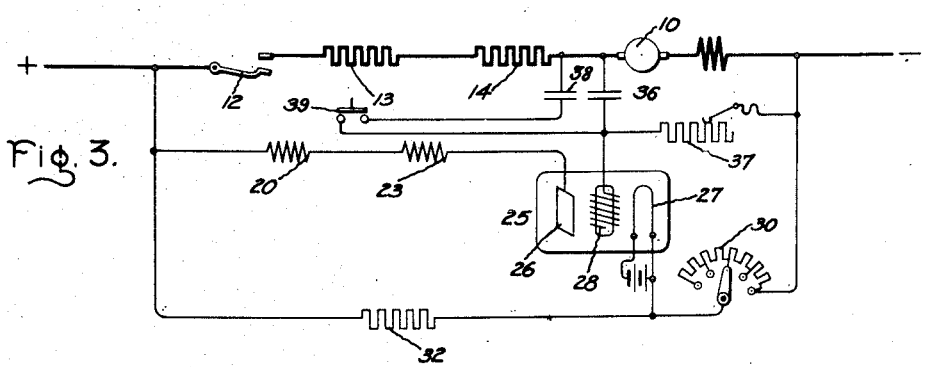
Inventor:
Ernst F. W. Alexanderson,
by
His Attorney Patented Apr. 15, 1924.

1,490,720

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF MOTOR CONTROL.

Application filed January 9, 1922. Serial No. 527,815.

*To all whom it may concern:*

Be it known that I, ERNST F. W. ALEXANDERSON, a citizen of the United States, residing at Schenectady, county of Schenectady, State of New York, have invented certain new and useful Improvements in Systems of Motor Control, of which the following is a specification.

My invention relates to the control of electric motors, and it provides improved means whereby the motors may be started and stopped and generally controlled in a safe, reliable and efficient manner.

More specifically, the present invention relates to improvements of the system of motor control for which Benjamin W. Jones filed an application for patent, Serial No. 527,840, on January 9, 1922, and which he assigned to the same assignee as this invention. However, I would have it understood that in certain of its aspects, my invention has a broader application than its use in a system of the general type disclosed in the said application for patent. The arrangements described and claimed in the said Jones application make use of the idea of controlling an electric motor in accordance with the rate of change of a condition of the motor or of the motor circuit. One arrangement makes use of the broad idea by controlling the motor in accordance with the rate of change of the generated or counter-electromotive force of the motor which is proportional to the speed of the motor. In another arrangement, the control of the motor is in accordance with the rate of change of the current taken by the motor, and in another arrangement the control is in accordance with the rate of change of the voltage drop across an accelerating resistor. The acceleration of the motor is governed by electromagnetic switches of the type shown, described and claimed in the application for patent by Eugene R. Carichoff and Benjamin W. Jones, Serial No. 421,291, filed November 2, 1920, and assigned to the same assignee as this invention. These switches are provided with two magnetically independent electromagnets which jointly control a switch member which is biased to a predetermined position, as, for instance, the closed position. One of the electromagnets may be termed a "pick-up" electromagnet and the other may be termed a "drop-out" electromagnet. In the aforesaid Jones application, the "pick-up" electromagnet is energized to open the switch and the "drop-out" electromagnet is energized responsively to the rate of change of an operating condition of the motor, such as the rate of change of an electrical condition of the motor circuit, to govern the closing of the switch to thereby govern the acceleration of the motor. The winding of the "drop-out" electromagnet is energized from the secondary of a transformer, the primary of which may either be connected across the motor armature terminals or across one of the accelerating resistors as a shunt transformer, or be directly included in the motor armature circuit as a series transformer.

In order to obtain sufficient energy from the secondary of the transformer for the control of the closing of the switch, a fairly large transformer is necessary, and one of the objects of the present invention is to provide an arrangement in which the transformer or other means for supplying a potential which varies with the rate of change of the selected motor operating condition may be quite small or be eliminated entirely. My invention is not necessarily limited to its use in connection with a transformer and switches of the type disclosed in the said Carichoff and Jones application, Serial No. 421,291, but the principles thereof are readily explained in connection with an arrangement involving the use of a transformer and switches of that type.

In accordance with my invention, an electric valve such as a pliotron or radiotron is used to regulate sufficient power to control or operate motor controlling means such as an electroresponsive switch, which in turn controls the motor. A pliotron or radiotron is an electron discharge device which comprises three principal elements; namely, the plate or anode, the filament or heated cathode, and the grid. The plate may be connected to the positive side of the supply circuit for the motor, and the filament, which must be heated to incandescence in any suitable manner, may be connected to the negative side of the supply circuit. The grid, which is ordinarily located between the plate and filament, is provided for supplying an electrostatic field. If this field is negative relative to the filament, it will practically shut off or quench the current flowing between the plate and filament, but if the field is positive it will augment the current flowing. If the field is neutral or zero, the current flowing will be about one-half of the maximum current obtainable by making the field positive. The voltage of the grid need be comparatively low in order to have either a shut off or a maximum current condition. The winding of the electro-responsive motor controlling switch or the "drop-out" winding of an electromagnetic switch such as described and claimed in the said Carichoff and Jones application, Serial No. 421,291, may be connected in series with the plate of the pliotron, and the grid is given a negative value when the controlling condition of the motor is constant; that is, when the speed of the motor, or the motor counter-electromotive force, or the current taken by the motor, or the drop across an accelerating resistor, or any other selected condition of the motor, is constant. The potential of the grid is changed to a positive value while the selected condition of the motor is changing. Thus, the "drop-out" winding of the electromagnetic switch may be thereby energized while the selected condition of the motor is changing and deenergized when the condition becomes constant. A very small impulse is therefore necessary to energize the pliotron grid, and this small impulse may be used to regulate sufficient power to control the operation of the motor accelerating switches, or any other suitable means for controlling the motor. The pliotron thus serves as an electrical amplifier or intensifier for the comparatively small impulse which is obtained from a transformer or a condenser connected so as to deliver an impulse in accordance with the rate of change of the selected operating condition of the motor.

For a better understanding of my invention, reference is had to the accompanying drawing wherein Fig. 1 shows an embodiment of the invention employing an electric valve or electron discharge device in connection with a transformer having its primary connected across the motor armature terminals; Fig. 2 is a very simplified diagram of Fig. 1; and Fig. 3 is another very simplified diagram showing an arrangement involving the use of a condenser instead of the transformer as in Figs. 1 and 2.

Referring to the drawing, the electric motor 10 is adapted to be connected to the source of supply 11 by means of the electromagnetic line switch 12, which when closed connects the motor to the source of supply through a circuit including the starting resistors 13 and 14. The electromagnetic relays 15 and 16 are provided for controlling the closing of the resistor electromagnetic switches or contactors 17 and 18. These relays are preferably of the type disclosed in the said Carichoff and Jones application, Serial No. 421,291, filed November 2, 1920. The relay 15 comprises a "pick-up" winding 19 and a "drop-out" winding 20 which jointly and severally control the single switch member 21. The relay 16 comprises the "pick-up" winding 22 and the "drop-out" winding 23 which jointly and severally control the switch member 24. The "drop-out" windings 20 and 23 of these relays are controlled by means of the electric valve or electron discharge device 25.

This electron discharge device comprises a plate 26 which is connected to the positive side of the source of supply through the "drop-out" windings 20 and 23, the filament or heated cathode 27 and the grid 28 interposed between the plate 26 and the cathode 27. The cathode 27 is adapted to be heated by means of a suitable low potential source of current as indicated at 29, and this cathode is connected to the negative supply conductor through the comparatively low resistance regulating resistor 30. The grid 28 is connected to the secondary of the potential transformer 31 which has its primary connected across the armature terminals of the electric motor 10. One terminal of the secondary of the transformer 31 is connected to the negative supply conductor and the other terminal is connected directly to the grid 28. The comparatively high resistance resistor 32 is connected across the source of supply in series with the regulating resistor 30, thereby forming a potentiometer connection, so that the potential of the filament 27 may be very accurately controlled by means of the regulating resistor 30. The potential of the filament will be positive with respect to the grid.

As thus constructed and arranged, the operation of my invention is as follows: In order to start the motor, the disconnecting switch 33 will first be closed. The "pick-up" windings 19 and 22 of the accelerating relays 15 and 16 will thereby be energized across the source of supply to attract their respective switch members 21 and 24 and magnetically hold these switch members in the open position. In order to start the motor, the pilot or master switch 34 will first be closed, thereby energizing the line contactor 12 to close and connect the motor to the source of supply through the accelerating resistors 13 and 14. The closing of the line contactor 12 short circuits the "pick-up" winding 19 of the relay 15, but this relay will be held open by means of the "drop-out" winding 20 in a manner presently to be explained. The closing of the contactor 12 also connects the "pick-up" winding 22 of the relay 16 across the accelerating resistor 13, so that this relay will be magnetically held open by the windings 22 and 23.

The "drop-out" windings 20 and 23 of the relays will be energized through the electron discharge device 25 because of the fact that the grid 28 will be changed from a negative to a positive potential due to the closing of the line contactor 12. When the line contactor 12 closes, the rate of change of the generated potential of the motor will be a substantial value, and as the motor accelerates, this generated or counter-electromotive force of the motor will gradually increase, but the rate of increase will become less as the speed of the motor becomes constant. The voltage induced in the secondary of the transformer will therefore approach a zero value, and the potential of the grid 28 will gradually change from a positive to a negative value. The current through the secondary of the transformer has a path through a local circuit which includes the filament 27 and the resistor 30. The principal effect of the grid 28 is to set up an electrostatic field between the plate or anode 26 and the cathode 27 for the purpose of regulating the value of current through the "drop-out" windings 20 and 23 of the controlling relays, so that when the grid potential becomes a predetermined negative value with respect to the filament 27, the value of current through the device 25 and the "drop-out" windings of the relays will be insufficient to magnetically hold the relay 15 open. When the speed of the motor has finally become substantially constant, the electrostatic field set up by the grid 28 will be of a negative value such that the current through the electron discharge device will be very small and the "drop-out" windings of the relays will be substantially deenergized.

The deenergization of the "drop-out" winding 20 of the relay 15 will release the switch member 21 to drop to its normally closed position in accordance with the bias of the spring 35, the relay 16 remaining in the open position because of the fact that the "pick-up" winding 22 is energized across the accelerating resistor 13. When the relay 15 closes, the resistor contactor 17 is closed, thereby short circuiting the accelerating resistor 13. When this happens, the "pick-up" winding 22 of the relay 16 will be short circuited and deenergized, but the "drop-out" winding 23 of this relay will be energized through the electron discharge device to maintain the relay in its open position. It is also to be noted that the electromagnet associated with the "pick-up" winding 22 will retain its holding effect for an interval of time, because it will take a certain time interval for the magnetism of the "pick-up" electromagnet to decrease because of the short circuiting of its winding, in a manner well understood. The closing of the contactor 17 will cause the grid 28 to become positive with respect to the filament 27, thereby permitting an appreciable current to pass through the electron discharge device to energize the "drop-out" winding of the relay 16 to hold the switch member of this relay in the open position. The "drop-out" winding 20 of the relay 15 will also be energized, but this energization will not be sufficient to open the relay. As the motor accelerates in speed, the grid 28 will set up an electrostatic field which gradually approaches the negative value at which the passage of current through the electron discharge device is quenched, thereby deenergizing the "drop-out" magnet 23 when the speed of the motor has become substantially constant. The closing of the relay 16 will energize the resistor contactor 18 to close and short circuit the accelerating resistor 14. The current passing through the "drop-out" windings of the relays 15 and 16 will not be sufficient to open these relays after they have been closed in the manner explained.

By reference to Fig. 3, it will be seen that instead of the transformer 31 of Figs. 1 and 2, I have provided a condenser 36 for regulating the electrostatic field set up by the grid 28. The comparatively high resistance variable resistor 37 is provided for gradually draining off the electrostatic charge of the condenser 36 at a desired rate. The arrangement shown in Fig. 3 is a very simplified diagram of the arrangement of Fig. 1 with the condenser 36 used instead of the transformer 31. This arrangement will operate in the same manner as that previously described in connection with Figs. 1 and 2. It is to be noted, however, that the condenser arrangement of Fig. 3 will operate more as a timing device than as a rate-of-change device. The condenser 38 may be arranged to be connected in multiple with the condenser 36 by the closing of an auxiliary switch 39 associated with the contactor 17 for the purpose of obtaining a greater effect from the condenser at this point in the motor acceleration to give a time delay in the closing of the next contactor.

While I have shown my invention as used in connection with a system in which the accelerating resistors are intended to close when the generated or counter-electromotive force of the motor has become substantially constant, I would have it understood that my invention is not necessarily limited to its use in connection with this particularly selected changing motor operating condition, but it is applicable generally to the control of electric motors in accordance with the rate of change of any of the well known motor operating conditions.

If the ratio of inductance (L/R) of the transformer 31 is large, then the transformer will function more as a timing device than as a rate-of-change device. If L/R is small, then the transformer will have to be larger, but it will function more as a rate-of-change device. The impressed voltage on the transformer increases as a function of the speed and the induced current will be in one direction approaching zero only when the motor speed has ceased to increase. This produces a result in accordance with requirements, and the L/R factor may be used best suited to the work without being otherwise restricted.

The transformer and electron discharge device arrangement of Fig. 1 may be designed so as to give a control which is a combination of rate-of-change and time functions, and the rate-of-change function may be predetermined to be the predominating function. The condenser and electron discharge device arrangement of Fig. 3 will give a control which has a time function as the major factor, but the rate-of-change and time functions may be predetermined to give an appreciable rate-of-change function.

In accordance with the provisions of the patent statutes, I have described the principle of operation of my invention, together with the apparatus which I now consider to represent the best embodiment thereof, but I desire to have it understood that the apparatus shown in only illustrative and that the invention may be carried out by other means.

What I claim as new and desire to secure by Letters Patent of the United States, is:—

1. A control system for electric motors comprising motor controlling means, and an electron discharge device connected to be subjected to a selected motor operating condition and connected to regulate the supply of energy to the said motor controlling means in accordance with the selected motor operating condition.

2. A control system for electric motors comprising an electron discharge device having a grid connected to have a potential which varies with a selected motor operating condition, and motor controlling means under the control of the said device.

3. A control system for electric motors comprising motor controlling means, an electron discharge device for controlling the said means, the said device having a grid, a heated cathode and an anode, and connections whereby the potential of the grid of the device is varied in accordance with a selected motor operating condition and the said means is connected to a source of supply through the said cathode and anode so that the energy delivered to the said means is under the control of the potential of the said grid.

4. A control system for electric motors comprising an electric valve, means controlled thereby for controlling the motor, and connections whereby the said valve is regulated responsively to the rate of change of an operating condition of the motor.

5. A control system for electric motors comprising an electron discharge device, means controlled thereby for controlling the motor, and connections whereby the said device amplifies an operating condition of the motor to control the said means.

6. A control system for electric motors comprising an electron discharge device, means controlled thereby for controlling the motor, and connections whereby the said device controls the said means in accordance with the rate of change of the counter-electromotive force of the motor.

7. A control system for electric motors comprising an electron discharge device, electroresponsive means controlled thereby for controlling the motor, and connections whereby the said device varies the supply of energy to the said electroresponsive means in accordance with the rate of change of an electrical condition of the motor.

8. A control system for electric motors comprising an electron discharge device, electroresponsive switch mechanism controlled thereby for controlling the motor, and connections whereby the said device regulates the current supplied to the said electroresponsive switch mechanism in accordance with the rate of change of an operating condition of the motor.

9. A control system for electric motors comprising motor controlling means, an electron discharge device having a grid, means connected to impress on the said grid an electrical potential which varies responsively to the rate of change of an operating condition of the motor, and connections whereby the said motor controlling means is energized through the said device and the supply of energy to the said means in varied in accordance with the potential of the said grid.

10. A control system for electric motors comprising electromagnetic switch mechanism for controlling the motor, an electron discharge device having a grid, means connected to impress on the said grid an electrical potential which varies responsively to the rate of change of the counter-electromotive force of the motor, and connections whereby the said switch mechanism is energized through the said device and the supply of energy to operate the said switch mechanism is varied in accordance with the potential of the said grid.

11. A control system for electric motors comprising an electron discharge device, means controlled thereby for controlling the motor, and connections between the said device and the motor to be controlled whereby the said device controls the said means in accordance with a time function and the rate of change of an operating condition of the motor.

12. A control system for electric motors comprising an electron discharge device, electroresponsive switch mechanism controlled thereby for controlling the motor, and connections between the said device and the motor to be controlled whereby the said device regulates the current supplied to the electroresponsive switch mechanism in accordance with a time function and in accordance with the rate of change of an operating condition of the motor.

13. A control system for electric motors comprising electromagnetic switch mechanism for controlling the motor, an electron discharge device having a grid, means connected to impress on the said grid an electrical potential which varies responsively to the rate of change of the counter-electromotive force of the motor and with a time function, and connections whereby the said switch mechanism is energized through the said device.

14. A control system for electric motors comprising electromagnetic switch mechanism for controlling the motor, an electron discharge device having a grid, a transformer electrically connected to the motor to induce a voltage in its secondary which varies with the rate of change of an operating condition of the motor, and connections whereby the said grid is connected to the secondary of the said transformer, the said switch mechanism is energized through the said device, and the supply of energy to operate the said switch mechanism is varied in accordance with the potential of the said grid.

15. A control system for electric motors comprising electromagnetic switch mechanism for controlling the motor, an electron discharge device having an anode, a heated cathode and a grid, a transformer having its primary connected across the motor armature and its secondary connected to the said grid to impress thereon a potential which varies responsively to the rate of change of the counter-electromotive force of the motor, the said switch mechanism being connected to a source of supply through the said cathode and anode so that the supply of energy to operate the said switch mechanism is varied in accordance with the potential of the said grid.

16. A control system for electric motors comprising an electromagnetic switch for controlling the motor, the said switch having a switch member biased to one position and two windings which successively control the operation of the switch, one of said windings for governing the operation of the switch member to a second position and the second of said windings for governing the return of the switch member to its biased position, and an electric valve connected to regulate the current supplied to the said second winding in accordance with the rate of change of an operating condition of the motor.

17. A control system for electric motors comprising an electromagnetic switch for controlling the motor, the said switch having a switch member biased to one position and two windings which successively control the operation of the switch, one of said windings for governing the operation of the switch member to a second position and the second of said windings for governing the return of the switch member to its biased position, an electron discharge device having a grid connected to have a potential which varies with a selected motor operating condition, and connections whereby the supply of current to the said second winding is governed in accordance with the potential of the said grid.

18. A control system for electric motors comprising an electromagnetic switch for controlling the motor, the said switch having a switch member biased to one position and two windings which successively control the operation of the switch, one of said windings for governing the operation of the switch member to a second position and the second of said windings for governing the return of the switch member to its biased position, an electron discharge device having a grid, a heated cathode and an anode, means for impressing a potential on the said grid which varies in accordance with a selected motor operating condition, and connections whereby the said second winding is connected to a source of supply through the said cathode and anode so that the energy delivered to the said second winding is under the control of the potential of the said grid.

19. A control system for an electric motor comprising a resistor, an electromagnetic switch for controlling the resistor, the said switch having a switch member biased to one position and two windings for successively controlling the operation of the switch, one of said windings for governing the operation of the switch member to a second position and the second of said windings for governing the return of the switch member to its biased position, an electron discharge device having a grid, a heated cathode and an anode, a transformer having its primary connected across the motor armature and its secondary connected to the said grid for impressing a potential on the said grid which varies in accordance with the rate of change of the counter-electromotive force of the motor, and connections whereby the said second winding is connected to a source of supply through the cathode and anode of said device so that the energy delivered to the said second winding is under the control of the potential of said grid.

In witness whereof, I have hereunto set my hand this 7th day of January, 1922.

ERNST F. W. ALEXANDERSON.